Aug. 20, 1935.  R. R. ERBE  2,012,185
MULTIPLE PLAYING PHONOGRAPH
Filed Sept. 25, 1929  7 Sheets-Sheet 1

INVENTOR
RALPH R. ERBE
BY
ATTORNEY

Aug. 20, 1935.  R. R. ERBE  2,012,185

MULTIPLE PLAYING PHONOGRAPH

Filed Sept. 25, 1929    7 Sheets-Sheet 2

INVENTOR
RALPH R. ERBE
BY
ATTORNEY

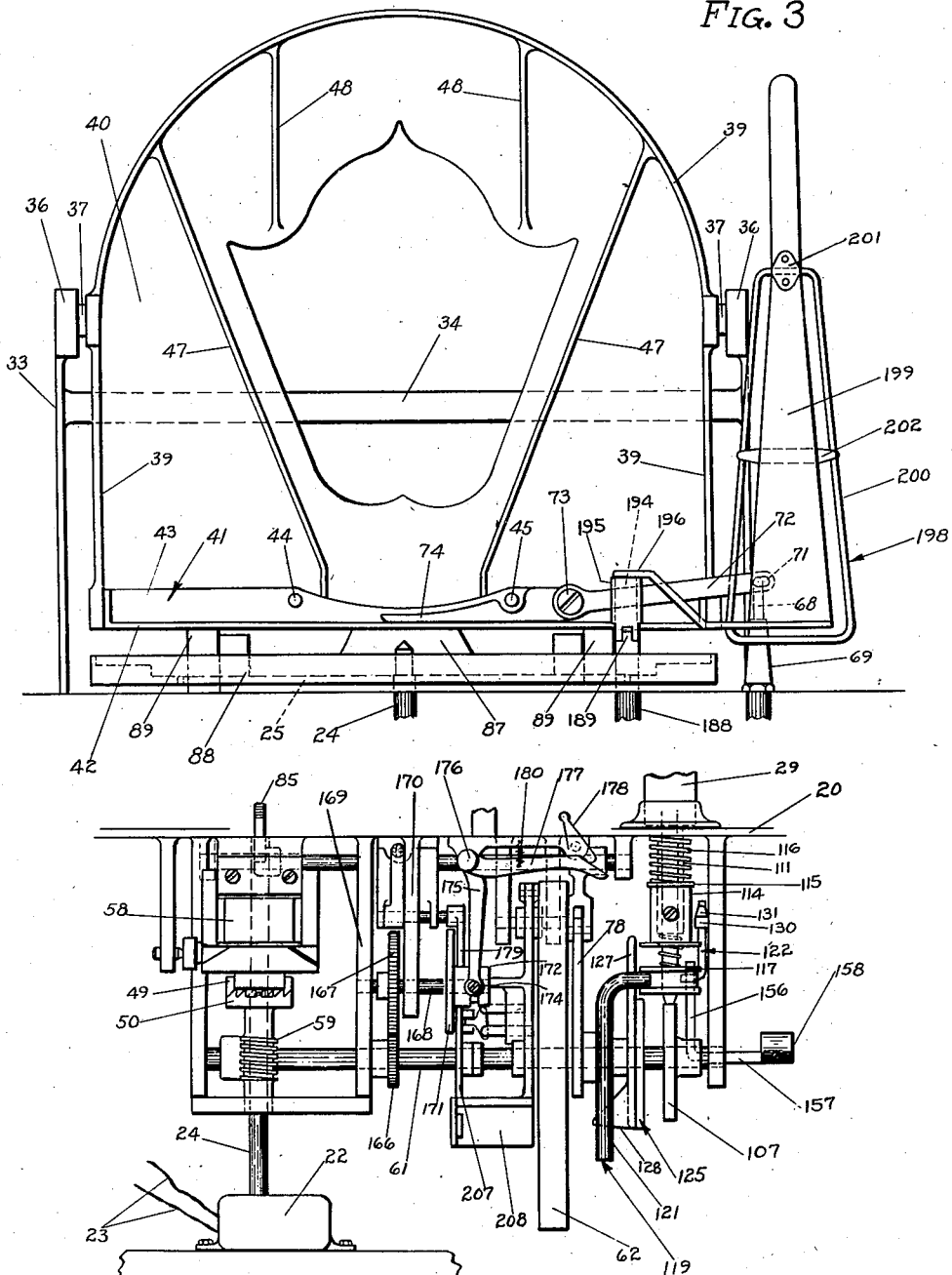

Aug. 20, 1935.  R. R. ERBE  2,012,185

MULTIPLE PLAYING PHONOGRAPH

Filed Sept. 25, 1929  7 Sheets-Sheet 4

INVENTOR
RALPH R. ERBE
BY
ATTORNEY

Aug. 20, 1935.　　　R. R. ERBE　　　2,012,185
MULTIPLE PLAYING PHONOGRAPH
Filed Sept. 25, 1929　　　7 Sheets-Sheet 5
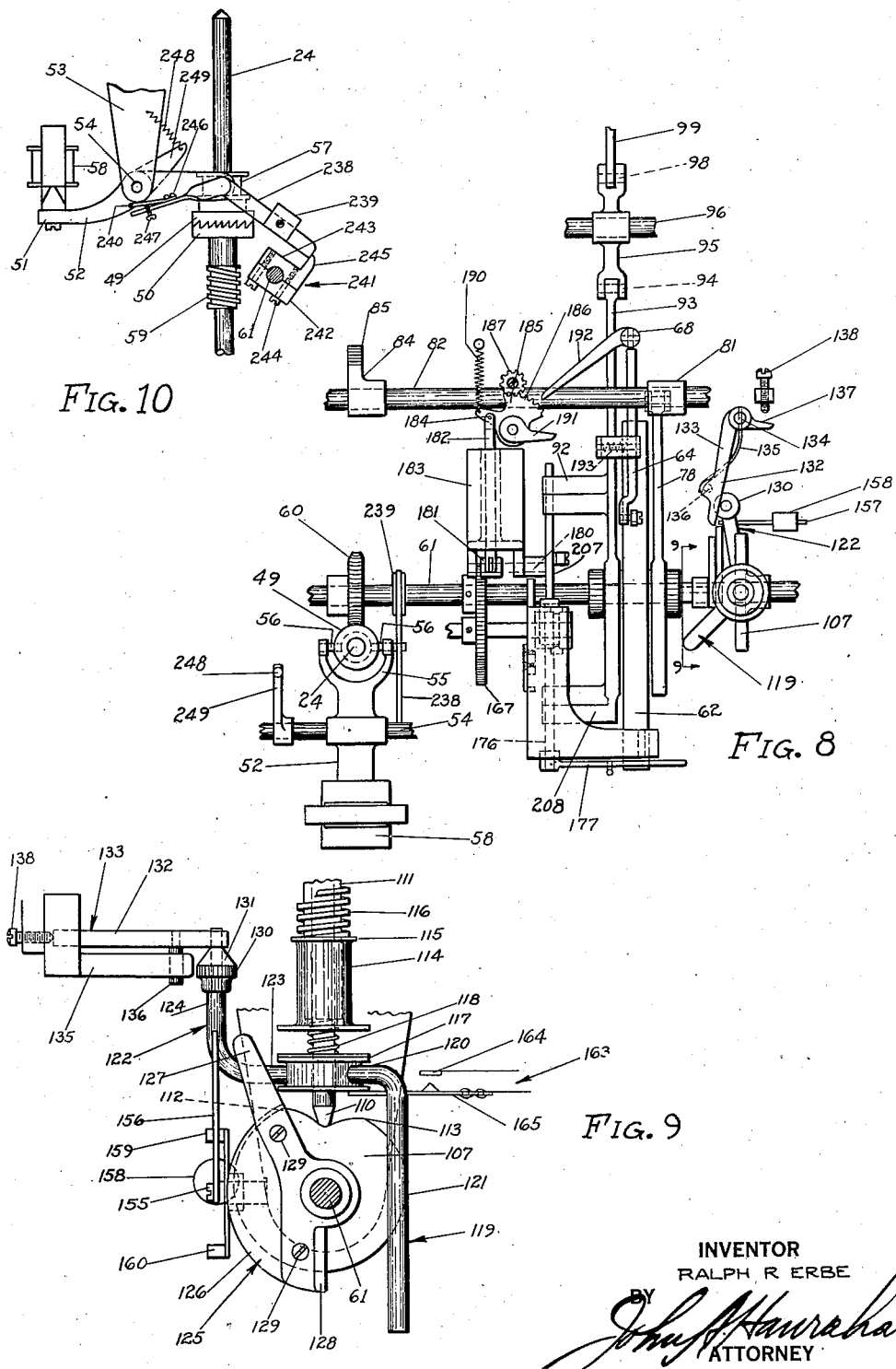
INVENTOR
RALPH R ERBE
BY
ATTORNEY Aug. 20, 1935.   R. R. ERBE   2,012,185
MULTIPLE PLAYING PHONOGRAPH
Filed Sept. 25, 1929    7 Sheets-Sheet 6
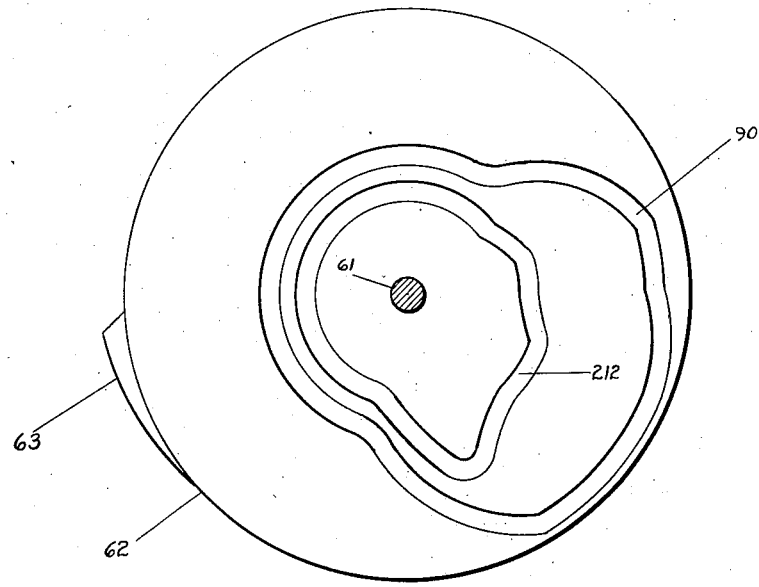
FIG. 11
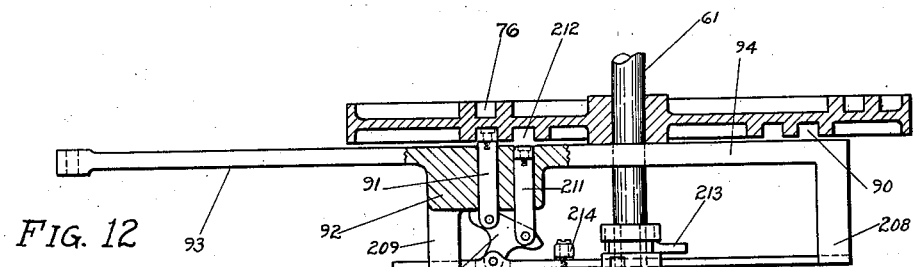
FIG. 12
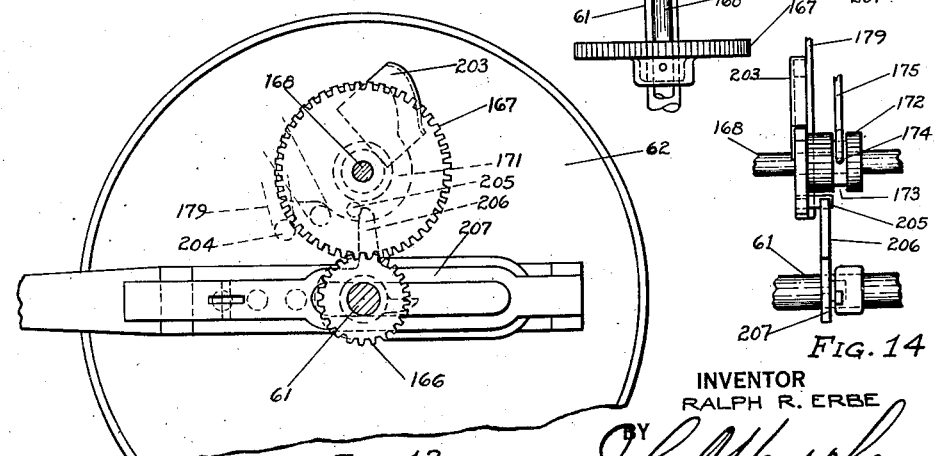
FIG. 13
FIG. 14
INVENTOR
RALPH R. ERBE
BY
John J. Hanrahan
ATTORNEY Aug. 20, 1935.  R. R. ERBE  2,012,185
MULTIPLE PLAYING PHONOGRAPH
Filed Sept. 25, 1929  7 Sheets-Sheet 7
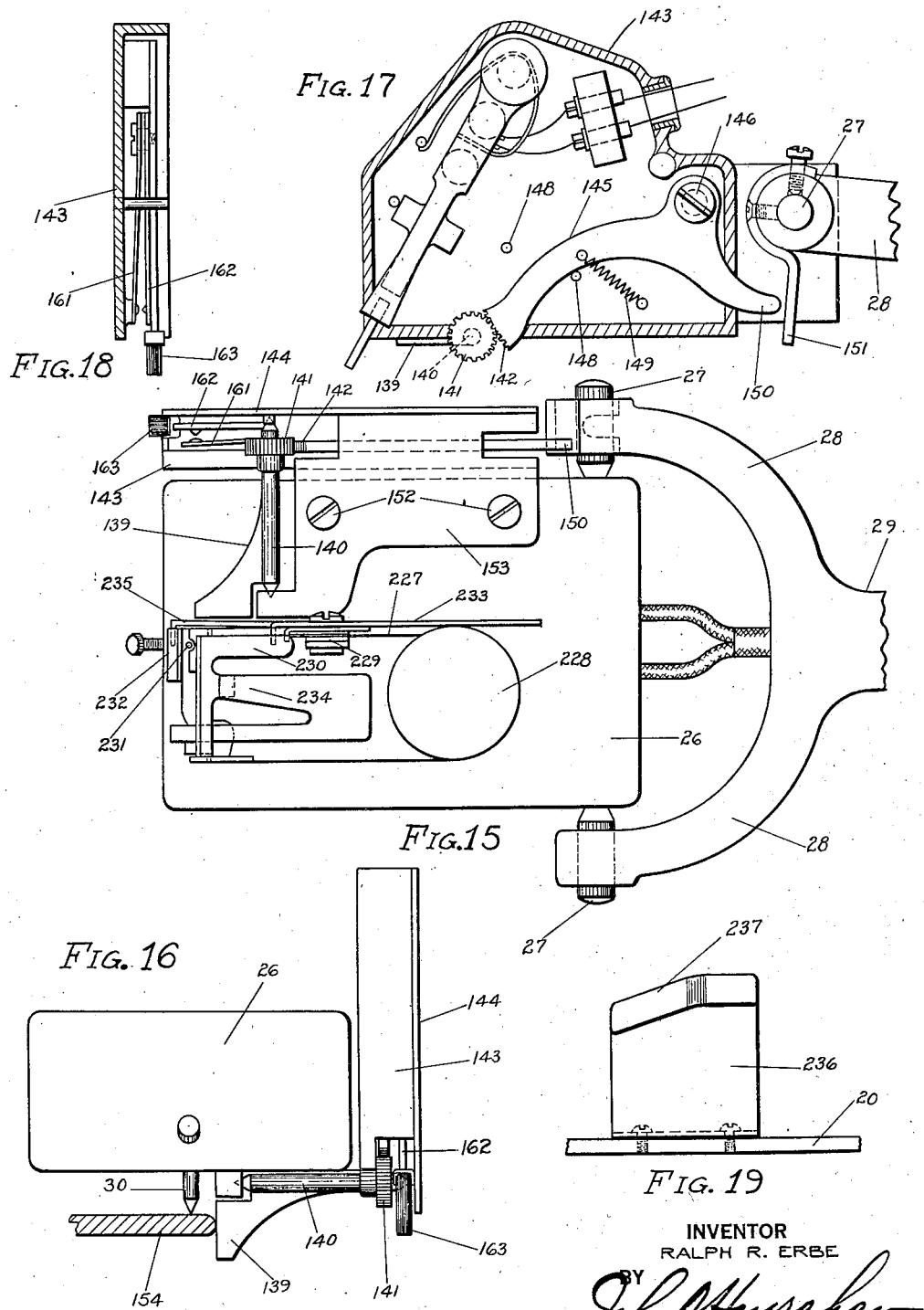
INVENTOR
RALPH R. ERBE
BY
ATTORNEY Patented Aug. 20, 1935

2,012,185

UNITED STATES PATENT OFFICE 2,012,185

MULTIPLE PLAYING PHONOGRAPH

Ralph R. Erbe, Bridgeport, Conn., assignor, by mesne assignments, to The Capehart Corporation, Fort Wayne, Ind., a corporation of Indiana Application September 25, 1929, Serial No. 394,981

32 Claims. (Cl. 274—10)

This invention relates to new and useful improvements in reproducing means and methods, and as particularly relates to an automatic or multiple playing phonograph or talking machine being a continuation in part of Patent No. 1,872,706, issued August 23, 1932, application for which was filed April 16, 1928 and Patent No. 1,872,707, issued August 23, 1932, application for which was filed April 26, 1929.

An object is to provide a reproducing machine for automatically playing a plurality of records of various sizes irrespective of the manner in which, or the means by which, they are fed to the machine.

Another object is to provide a reproducing machine including a single set of means for removing records of various sizes from a reservoir, placing said records in playing position, and returning them to the reservoir after they have been played.

Another object is to provide a phonograph or reproducing machine adapted to play a plurality of records one at a time and including means for reversing the position of a record on the turntable after one side has been played to immediately present the other side for playing.

A further object is to provide a phonograph adapted to play a plurality of records one at a time, and including means to reverse the position of the record on the turntable after one side of the record has been played, to present the other side for playing, and including means for rendering the reversing means inoperative.

An additional object is to provide a phonograph adapted to play a plurality of records and including means to feed the records one at a time to playing position, reverse the record in its playing position after one side has been played, to present the other side for playing, and to return the played record to the magazine with its sides in their original relative position in the magazine.

Another object is to provide a phonograph adapted to play a plurality of records of various sizes one at a time, and to reverse the records irrespective of their sizes while in playing position after one side has been played whereby to present the other side for playing.

A further object is to provide a machine for automatically playing one or both sides of records of various diameters.

A still further object is to provide a machine for automatically playing one or both sides of records of various diameters and for returning the records to a magazine with their sides reversed when but one side has been played, and with the sides in their original position when both sides have been played.

Yet another object is to provide an automatic phonograph including a record rotating means, a record reservoir for holding a plurality of records, a reproducing means to co-operate with the record on said rotating means, means to transfer a record from the rotating means to the reservoir, and means to move into the path of movement of the record being returned to the reservoir, to cause it to slide back onto the rotating means in reversed position.

With the foregoing and other objects in view, as will become more apparent as the description proceeds, the invention includes certain novel features of construction, combination and arrangement of parts as will be hereinafter more particularly described and claimed.

In the accompanying drawings and the following description, the invention is described in detail in one embodiment. However, it is to be understood that the invention is not limited to the disclosure and that changes in construction, combination, and arrangement of parts may well be made within the spirit and scope of the appended claims to which reference must be had for a definition of the limitations of the invention.

In the drawings:—

Fig. 3 is a front elevational view of the upper part of the mechanism;

Fig. 4 is a front elevational view of the lower portion of the mechanism;

Fig. 7 is a vertical sectional view through the record reservoir or magazine showing the location of records therein;

Fig. 8 is a top plan view of the operating mechanism with the supporting plate and top structure removed;

Fig. 9 is a view on the line 9—9 Fig. 8 looking in the direction indicated by the arrows;

Fig. 10 is a detail of the clutch operating mechanism;

Fig. 11 is a face view showing the two side track of the main operating cam;

Fig. 12 is a sectional view of the cam showing the associated parts forming part of the reversing mechanism;

Fig. 13 is an elevational view of the parts shown in Fig. 12;

Fig. 14 is a detailed view looking from the right in Fig. 12;

Fig. 15 is a bottom plan view of the pick-up device showing the circuit closing and stylus feeding means carried thereby;

Fig. 16 is a front elevational view of the same;

Fig. 17 is a view looking from the right in Fig. 16, the cover plate for the circuit closing mechanism being removed;

Fig. 18 is a front view showing the circuit closing mechanism, the housing being shown in section;

Fig. 19 is an elevational view of the fixed cam carried on the supporting plate for operating the stylus feeding mechanism.

Figure 1:
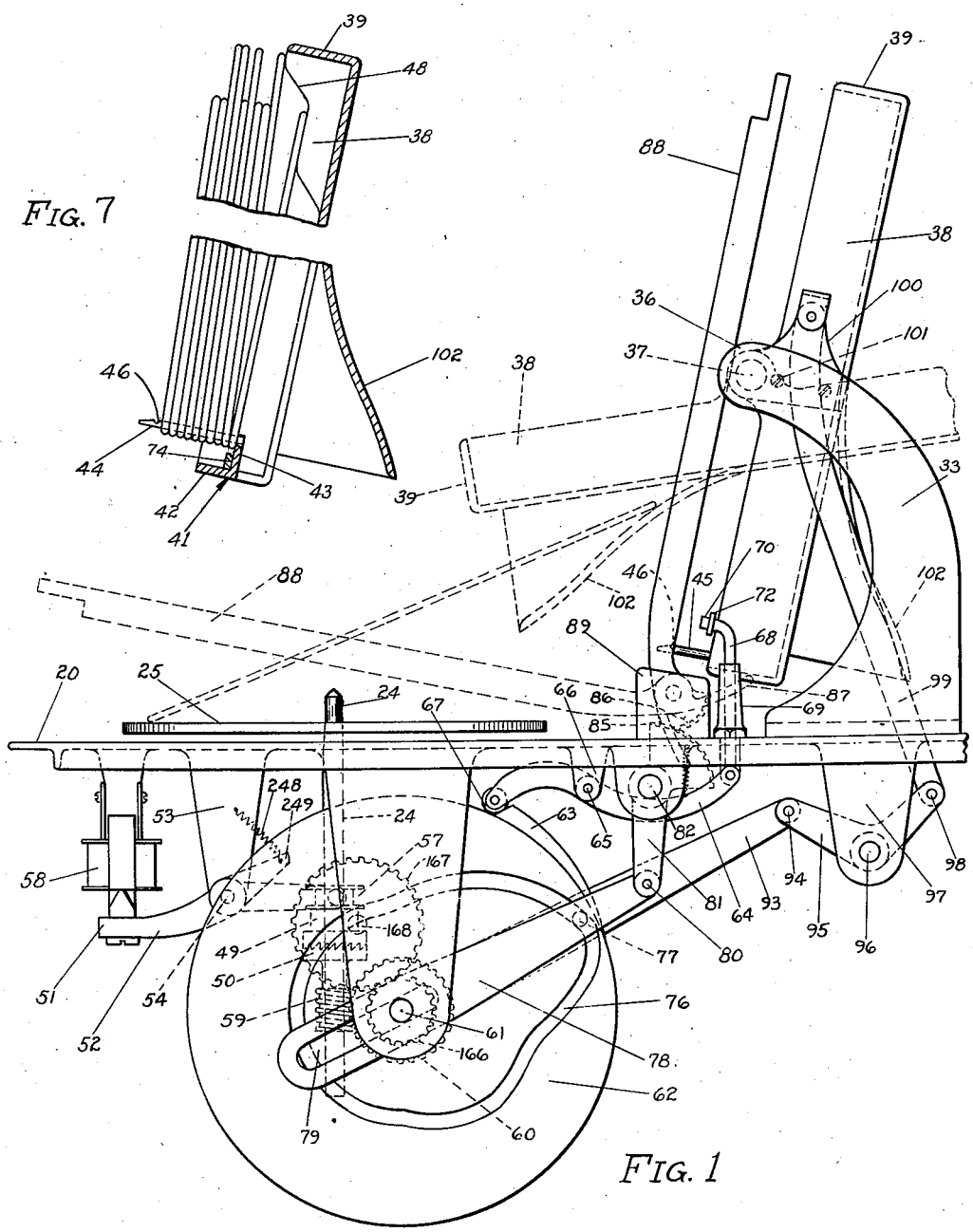
Figure 1 is a side elevational view showing the assembled machine.

Referring in detail to the drawings at 20 is shown a base or supporting plate having depending bearing portions on which various parts of the mechanism are mounted. Disposed on a support 21 below the base or plate 20 is an electrical motor 22 to which current is supplied from any suitable source through the wires or conductors 23.

This motor, either by direct drive or through gearing if desired, drives the vertically extending spindle 24 which extends upwardly through the base or plate 20 and carries at the upper side of said plate a turntable or other record support 25. It will be obvious that since the spindle is an integral shaft, the turntable 25 will be driven as long as the motor 22 is in operation.

A reproducer or pick-up 26 is used for taking the recorded matter from the records supplied to the turntable 25. This pick-up is pivotally mounted for movement in a vertical plane, on screws or other bearing means 27 carried by the arms 28 of a pick-up supporting arm 29. Arm 29 is mounted for movement in a horizontal plane over the record and when the stylus 30 of the pick-up 26 has been brought into engagement with a record, the pick-up and arm 29 are fed across the record by contact of the stylus with the record groove. Means are provided for elevating the stylus and swinging the tone arm to position the stylus for engagement with the beginning of a record, and this means will later be described in detail.

Means are provided for supporting a plurality of records, and for feeding them one at a time to the turntable 25. This means includes a bracket 31 secured to the base or plate 20 as by screws 32 and the bracket has a pair of upwardly curved space arms 33 connected and braced by a web portion 34 spaced above the base portion 35 of the bracket. At their upper ends the arms 33 are enlarged and provide bearings 36 for short shafts or studs 37 of a record magazine or reservoir 38. The reservoir or rack 38 is pivoted in the bearings 36 for a swinging movement between the solid line position and the dotted line position shown in Fig. 1.

The reservoir 38 is of a size to receive records of various diameters, the most common size records at the present time being those in the neighborhood of a diameter of 10" and those having a diameter of approximately 12".

Figure 6:
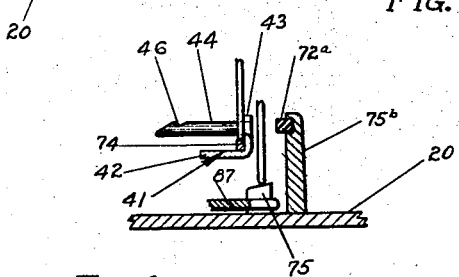
Fig. 6 is a detailed sectional view on the line 6—6 of Fig. 2.

Magazine 38 includes a forwardly projecting flange 39, back portion 40 and a lower cross bar 41 connecting the lower ends of the side portions of the flange 39. A sectional view of the cross bar 41 is shown in Figs. 6 and 7, and it will be apparent that this bar is an angle bar having a substantially horizontal portion 42 and a substantially vertical portion 43. Carried by the cross bar 41 at points equally spaced from its center, are a pair of forwardly projecting pins 44 and 45 disposed to be engaged by the lower edge of a stack of records to support the weight of the records in the magazine (see Fig. 7). These pins may be notched near their forward ends as at 46 to prevent records slipping off them.

Formed on or secured to the back 40 of the reservoir 38 are pairs of ribs 47 and 48. The rear record of those in the rack will have its upper portion in engagement with the ribs 48 when the records are stored. These ribs 47 function in the transfer of a record from the rack to the turntable 25 as will be later more fully described.

Means are provided for transferring records one at a time from the rack or magazine 38 to the turntable. The first step in this operation is the separating of a record from the stack of records. This requires the co-operation of the motor. A pair of clutch elements 49 and 50 are disposed about the vertical turntable spindle 24, and while the clutch element 49 is keyed to the spindle to turn with it, the clutch element 50 is free on the spindle, and normally remains stationary while the spindle revolves in it.

These clutch elements are held disengaged by the weighted end 51 of a lever 52 pivoted to the bracket 53 of plate or base 20, as at 54. The opposite end of lever 52 includes a yoke portion 55 having a pair of fingers or pins 56 disposed in a groove 57 of the clutch element 49. Lever 52 at its end 51 carries the core of a solenoid coil 58 which when energized attracts the core, rocking lever 52 about its pivot 54 and moving clutch element 49 into clutching engagement with clutch element 50.

When the coil 58 is de-energized, the weighted end 51 of lever 52 moves downwardly, the lever turning about its pivot and moving clutch element 49 upwardly out of clutching engagement with clutch element 50. With the clutch elements 49 and 50 in engagement, the coil 58 being energized, clutch element 50 is driven by the motor 22 and carries with it the worm 59 which in turn meshes with a worm wheel 60 secured to turn a cam and driven shaft 61.

Secured to the shaft 61 is a large cam 62 having in its sides cam tracks or grooves to be described, and having on its periphery a cam 63 for operating a mechanism to chop or remove a record from the magazine 38. A reversedly curved lever 64 is pivoted intermediate its ends as at 65 to a depending bracket 66 carried by the plate or base 20. At one end lever 64 carries a roller 67 for engagement with the periphery of the cam wheel 62 and cam 63 when it is desired to feed a record from the rack 38 to the turntable 25.

The opposite end of lever 64 is pivotally connected to an upright rod 68 passing through the base or plate 20 and through a guide means 69 secured to the upper side of the said base or plate. At its upper end the rod 68 is bent forwardly and its forward portion 70 passes through an elongated opening 71 in a knife or chopping lever 72. This lever 72 is pivoted intermediate its end at 73, to the cross bar 41 of the rack 38.

One end of the lever 72 (see Fig. 3) extends between the supporting pins 44 and 45, and this end 74 of the lever lies close against the vertical portion 43 of the angle bar 41. The rear surface of the portion 74 of lever 72 inclines downwardly as best shown in Fig. 6, and the central portion of the vertical part 43 of cross bar 41 is scooped out or cut away as clearly shown in Fig. 3. The last record of a group of records in the magazine rests on the portion 74 of lever 72, the rear of the lower edge portion of this record being in engagement with the vertical portion of the cross bar.

Now, when the cam 63 strikes the roller 67, lever 64 will be rocked on its pivot 65 drawing downwardly on the rod or upright 68, rocking lever 72 about its pivot 73 to elevate the end portion 74 of lever 72. This operation of course elevates the last record in the rack, and owing to the incline of the rear of knife portion 74 and the cut-away portion of bar 41, the record slides downwardly out of the rack and lands with its lower edge resting on spaced cushioning blocks 75 disposed on the plate 20.

The next step is to move the record from the rubber blocks or pads 75 to the turntable. To accomplish this, the cam wheel 62 is provided with a cam groove 76 in which is disposed a pin 77 carried by an arm 78 slotted at its lower end as at 79, the slot receiving the shaft 61. At its upper end, the member 78 is pivotally connected as at 80 to a lever 81 secured at its upper end to a shaft 82 supported by brackets depending from the lower side of the plate 20. Also secured to the shaft 82 is a segmental gear 84 spaced along the shaft from the lever 81 and having teeth 85 in mesh with a segmental gear 86 formed on the underside of a rearwardly extending tongue or projection 87 of a record carrying and guiding means or pan 88.

This pan 88 (see Fig. 2) is pivotally mounted on brackets 89 projecting upwardly from the plate 20, and is adapted to be swung on said pivotal mounting through an arc from the full line position of Fig. 1 to a dotted line position surrounding and below the turntable 25. When a record has been removed from the group and is resting on the pad 75, the rearwardly extending tongue portion 87 of pan 88 is disposed below these pads, the pan 88 being in the full line position of Fig. 1. As the pan swings downwardly on its pivot 89 toward the dotted line position, the tongue or extension 87 swinging upwardly between the pads 75, engages the lower edge of the record and elevates it.

As the pan 88 moves downwardly, the rack 38 is swung in the bearings 36 through an arc from the full line position of Fig. 1 to a position below the turntable when a new record is being fed to the turntable. For the purpose of swinging the rack through this arc, the cam 62 is provided with a cam groove 90 in which operates a pin 91 slidably mounted in a block or enlarged portion 92 of a slidable beam 93. When the pin 91 is in the groove 90, the device is operating to supply a record to the turntable.

Movement of the cam produces a sliding movement of the beam 91, the beam having a slot 94 through which the shaft 61 passes. At its upper end the beam 93 is pivotally connected as at 94 to one arm of a bell-crank lever 95 pivoted as at 96 on the bracket 97 depending from the plate 20. The opposite end or arm of bell-crank 95 is pivotally connected as at 98 to a link 99 pivotally connected at its upper end to a bracket 100 rigidly secured to the rack or magazine 38 as by screws or rivets 101. It will be apparent that the bracket 100 is disposed on the rack 38 rearwardly of the pivot studs or shafts 37, and that when the member 93 is moved forwardly by engagement of the pin 91 in the cam groove 90, the bell-crank lever 95 will be rocked, and operating through the link 99, will rock the rack 38 from its full line position of Fig. 1 to its dotted line position of that figure.

The rack 38 is, of course, swung on its pivot after a record has been chopped out of the rack and after the tongue or extension 87 of pan 88 has engaged and elevated the record from the pads 75. The rear portion or back 40 of the rack 38 flares outwardly as at 102, and the upper portion of the record being moved is, of course, in contact with the back of the rack.

Now, as the pan 88 moves downwardly on its pivots, the record slides forwardly on the pan, and movement of the rack 38 assists in the initial forward movement of the record and maintains one edge of the record elevated and the other edge extending through the pan, engages and slides across the surface of the turntable. The turntable is revolving but the record is held from lateral movement due to the revolving of the turntable, owing to the fact that the edge of the record is in engagement with the inner edge of the pan.

If a 10" record or a record of small diameter is being placed on the turntable, its forward edge will engage against the vertical wall 103 of the pan, and its further forward movement will be stopped. Now, as the rack 38 swings back, the cam 62 having completed one-half of a revolution, the rear edge of the record is gradually lowered (as the flared portion 102 moves from under the record) into position, the front edge of the record being engaged and stopped by the wall 103 of the pan, the record is let down properly centered on the turntable.

By way of explanation it may be noted that the edge of the record comes into engagement with the turntable on the opposite side of the center pin from that at which the reservoir or rack 38 is located. Further, the turntable is covered with some smooth surface material as "bakelite" in order that there will be no difficulty in sliding the record across it. This material gives sufficient traction and the record does not slip on it when in playing position.

Figure 2:
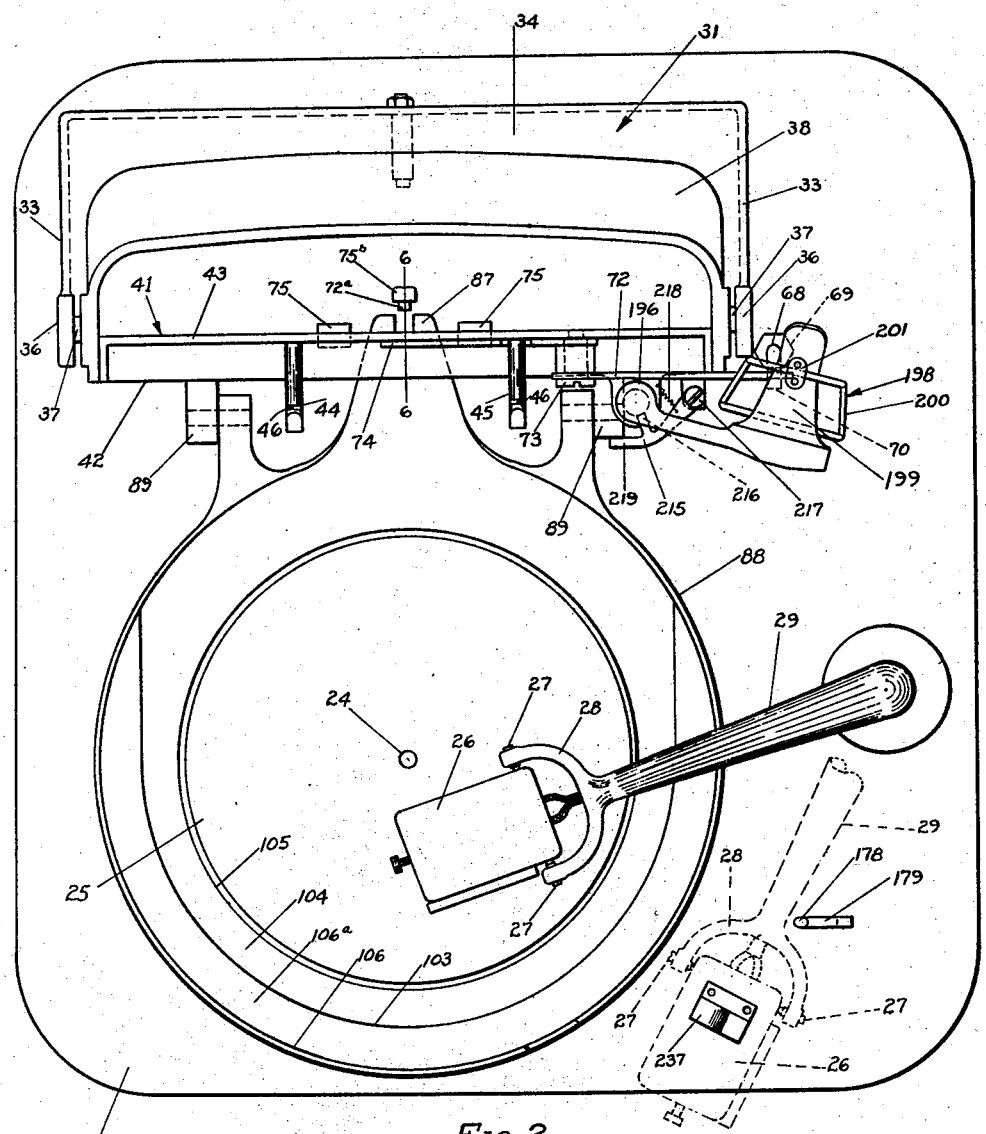
Fig. 2 is a plan view of the same.

The pan 88 is designed to accommodate different sized records, and with this in view, includes a portion 104 in one plane and having a central opening defined by the line 105 which, it will be apparent from Fig. 2, is of slightly greater diameter than the diameter of the turntable. The turntable is of less diameter than the diameter of the smallest record to be played. The arc defined by the wall 103 is struck on a radius equal to the radius of a small diameter record.

When records of larger diameter are to be played, they jump over the wall 103 owing to their large diameter, and their forward edges contact with the wall 106, the arc of which is struck on a radius equal to the radius of a record of large diameter. This wall 106 limits the forward movement of a record of large diameter, and as the rack 38 swings back into the full line position of Fig. 1, the record of large diameter is let down onto the turntable properly centered.

After the record is positioned on the turntable, the arm 29 is swung to position the stylus 30 at the beginning of the record. As will later be explained in detail, at the end of a record this arm 29 is elevated and swung to position the pick-up or sound box 26 as shown in dotted lines in Fig. 2. The elevating means for this purpose comprises a cam 107 (see Figs. 4 and 9) having a notch or depressed portion, in which the lower end of an extension 110 of a rod or shaft 111, attached to or formed with the lower end of the arm rests.

Cam 107 is eccentric and tapers downwardly around its surface from the high point 112 to the point 113. Disposed about the shaft 111 is a collar 114 between the upper flange 115 of which, and the plate 20, is disposed a coil spring 116. The coil spring surrounds the shaft 111 and obviously will be compressed on the collar 114 being elevated. A second collar 117 surrounds the extension 110 and is keyed to turn with it, but is slidable along the extension. A light coil spring 118 is disposed between the collars 114 and 117, and about the extension 110 of the shaft 111.

Rigid with the collar 117 is a bent rod 119 including a horizontal portion 120 and a depending portion 121. Extending in substantially the opposite direction to rod 119 is a rod 122 also rigid with the collar 117, and including a substantially horizontal portion 123 and an upstanding portion 124. Secured on the shaft 61 adjacent the cam 107 is a second cam 125 including an arcuate portion 126, an upstanding arm 127 and a lateral flange or wing 128. The portion forming the arm 127 and wing 128 (see Fig. 9) is obviously secured to the arcuate portion as by screws 129.

On the upper end of the upright arm 124 of bent rod 122 is secured a weight or block 130 having a conical upper portion 131. Rod 122 extends upwardly beyond the block 130 into a position to engage with the long arm 132 of a lever 133 pivoted as at 134. A flat spring 135 has one of its ends secured by the pivot 134 and its other end engages over a pin 136 carried by the arm 132. The normal tendency of this spring is to swing the lever 133 about the pivot and bring the short arm 137 of the lever into engagement with a stop-screw 138.

Assuming that the clutch elements 49 and 50 have been brought into engagement, shaft 61 will be driven as previously described, and the first part of its movement, cam 107 will cause the extension 110 of shaft 111 to ride upwardly out of the notch 109 compressing the springs 116 and 118. As extension 110 reaches the high point 112 of the cam, the pick-up and stylus have, of course, been so elevated that the stylus is no longer in contact with the record.

At this time arm 127 also turning with the shaft 61, engages the substantially horizontal portion 120 of rod 119 forcing the rod to move in an arc, the center of which is the extension 110. This movement of the rod is of course transmitted by collar 117, extension 110, and shaft 111 to the pick-up arm swinging the pick-up to a position beyond the edge of the record and into the dotted line position of Fig. 2. Spring 116 being compressed, frictionally resists this movement and prevents the arm 29 from being thrown outward with a sudden uncontrolled movement, and results in the arm being given a steady outward movement by continual contact with the cam.

After the rod 119 has been moved outwardly a predetermined distance, it of course moves out of the range of the arm 127. At this point rod 119 will be engaged by the arcuate surface 126, which will serve to hold the rod in its outermost position during the time it is in contact with surface 126. It of course, will be understood that the cams are continually turning, and when the end of surface 126 is reached, the wing or lateral portion 128 will engage the vertical portion 121 of rod 119, and gradually permit this rod to swing back towards its normal position as it moves outwardly toward the free end of portion 128. During this latter movement the arm 29 is of course swinging inwardly to bring the pick-up to the beginning of the record.

Spring 135, acting through arm 132, and the rod 122 serve to swing the arm 29 and pick-up to starting position at the edge of the record. While the arm is being swung outwardly as previously described, rod 122 is of course being moved with the collar 117. Due to engagement of the block 130 on the upper portion of the vertical arm 124 of the rod 122, with the arm 132 of lever 133, spring 135 is being compressed on the outward movement of the pick-up arm. This spring then resists the outward movement, and as soon as the cams reach a position where the wing 128 is in engagement with rod 119, spring 135 starts the return movement of the pick-up arm.

As previously stated, cam 107 is eccentric and the pick-up arm starts to descend immediately after it reaches the high point 112. This, of course, lessens the tension on the spring 116, and makes it easy for the spring 135 to swing the arm in. However, by the time extension 110 is at the point 113, the pick-up is at the edge of the record. Rod 112 has of course, moved upwardly with the collar 117 so that the arm 132 comes into engagement with the cone portion 131 of the block 130 during the inward movement of the pick-up arm.

Means are provided for engaging the edge of the record on the turntable to limit the inward movement of the arm under the action of spring 135, and the continual descent of the rod 122 moves the cone surface 131 out of engagement with the lever 132 so that action of the spring on the rod 132, and through to the pick-up arm, is discontinued shortly after the stop means on the pick-up engages the edge of the record.

The stop for engaging the edge of the record and limiting the inward movement of the pick-up, under the influence of spring 135, is shown in detail in Figs. 14, 15 and 16. This means includes a pivoted stop piece or wing 139 secured to a shaft 140 journaled at the underside of the pick-up 26. At its outer end shaft 140 carries a pinion 141 meshing with the teeth of an arcuate rack 142. For the purpose of actuating these parts, a housing 143 is provided at the side of, and carried by, the pick-up, the housing including a cover portion 144.

Rack 142 is formed at the end of a lever 145 disposed within the housing 143 and pivoted at 146. Stop pins 148 limit the movement of lever 145 on its pivot 146, and the lever is normally maintained in engagement with stop pin 148 by means of a light coil spring 149. Lever 145 has an extension 150 adapted to engage a finger 151 carried by one arm of the yoke 28 of the pick-up arm or support 129 during the operation of the device. As will be apparent from Fig. 15, the housing 143 is secured to the pick-up 26 as by screws 152 passing through the flange or bearing portion 153 formed within the housing.

It will be apparent that when the cam 107 acts to elevate the pick-up arm 29, the pick-up will swing about its pivots 27 and bring the extension 150 of lever 145 into engagement with the finger 151. This results in movement of the lever 145 abouts its pivot against the action of spring 149, and results in a partial rotation of the pinion 141 to move shaft 140, and rock the stop 139 from its position against the bottom of the pick-up as shown in Figs. 15 and 17, to the depending position shown in Fig. 16. In this latter position, the stop will engage the edge of the record 154 when the pick-up arm has been swung inwardly a sufficient distance.

When the stop 139 engages the edge of the record 154 the extension 110 has reached the point 113 on cam 107. As the extension moves downwardly into the notch 109, the pick-up is lowered to bring the stylus into engagement with the record, pivoting the pick-up on its pivot 27 as the stylus engages the record, resulting in moving the extension 150 away from finger 151 and permitting the spring 149 to rock the lever 145 on its pivot, resulting in a rotation of the pinion 141 and shaft 140 and the swinging of the stop into a flat position against the bottom of the pick-up as shown in Figs. 15 and 17.

Pivotally mounted as at 155 is an L-shaped lever having a substantially vertical arm 156 and a substantially horizontal arm 157 carrying a weight 158. Movement of this arm on its pivot is limited by stops at 159 and 160, and the upper end of the arm 156 is in engagement with the bent rod 122. Therefore, when the stylus is lowered onto the record, should it be lowered from the outer edge of the record, and not into the first terminal groove, the weighted lever attempting to rock about its pivot 155, will give the pick-up a slightly inward movement to bring the stylus into engagement with the first record groove.

It will, of course, be understood that when the extension 110 descends into notch 109 of cam 107 from the point 113, the cone portion 131 of block 130 has moved out of engagement with the arm 132, and that the pick-up is no longer influenced by the spring 135.

Disposed within the housing 143 is a switch means including a fixed contact member 161, and a movable contact member 162. The movable contact member 162 carries a small brush 163, and this brush feeds along in the record groove in the wake of the stylus. When the stylus reaches the inner end of the record, it has no further lateral movement, and the brush following along in the groove of the record, brings the contact point of member 162 into engagement with the contact point of member 161, closing a circuit to the solenoid coil 58. This results in the coupling of the clutching members 49 and 50.

As soon as the cam 107 acts to elevate the pick-up arm, the brush and stylus are moved out of engagement with the record, and the contacts 161 and 162 spring apart. To prevent the coil 58 from being de-energized by this action of contacts 161 and 162, a switch is provided comprising a fixed contact 164 and a movable spring contact 165. As the collar 117 is moved upwardly, contact 165 moves to engage contact 164 and maintain the circuit to the solenoid. When the collar 117 again descends, it moves the contact 165 to break the circuit to the coil 58, permitting the clutching elements 49 and 50 to separate, stopping all of the driving mechanism except the direct drive from the motor to the turntable.

After the coil 58 has acted to couple the clutching elements 49 and 50, the sliding beam 78 is operated by the pin 77 in the cam groove 76 to rock the pan 88 from the position shown in Fig. 2 to the solid line position shown in Fig. 1. In its upward movement the pan takes the played record off the turntable by lifting it on the surface 104 if it is a 10″ record, or lifting it on the surface 106 if it is a 12″ record. It will be apparent that in its full line position, (Fig. 1), the pan 88 is tilting rearwardly, and the record it has taken from the turntable will be dropped onto the supporting pins 44 and 45 of the rack. In the meantime, the rear record of the supply in the rack is being chopped out and dropped onto the cushions or pads 75, and held against rearward movement at its lower edge by the pad 72a on the upright 75b.

Means are provided for reversing a record whereby both sides of the record are played before the record is returned to the group. To this end a gear 166 is secured to shaft 61, and meshes with a larger gear 167 secured on a short shaft 168. The relationship between gears 166 and 167 is such that gear 166 makes two complete revolutions for each complete revolution of gear 167. Shaft 168 is rotatably mounted in the frame pieces 169 and 170.

Slidably mounted on one end of the shaft 168 is a cam 171 having a sleeve 172 provided with a groove 173 in which engage pins 174 carried by the lower yoked end of a lever 175. At its upper end this lever is secured to a rod or shaft 176 extending forwardly of the machine, and having secured to its forward end a lever 177 arranged substantially at right angles to the lever 175. Pivotally mounted by the plate 20 is a hand-piece 178 adapted to be swung from one side to the other of a slot 179 to rock the reversing mechanism into or out of operation.

With this hand-piece in the position shown in Figs. 2 and 4, the reversing means will operate. When the lever 178 is swung on its pivot to the opposite side of the slot 179, it depresses lever 177 against the action of spring 180, moving the cam 171 along shaft 168 in the direction of bracket 170. With the lever 178 in the position shown, the spring 180 has rocked the levers 177 and 175 to move the cam 171 in a direction away from bracket 170.

Now, when the clutching elements 49 and 50 are engaged, and the shaft 61 rotated, shaft 168 will likewise be rotated owing to the meshing of gears 166 and 167. During the first complete revolution of shaft 61, a new record will be fed to the turntable as previously described. However, during the second rotation of the shaft 61, that is, when a record has been played on one side, and pan 88 is moving to return the record to the magazine, the cam 171 will be rotated to a position to engage and swing outwardly a lever 179 depending from a short shaft 180.

As the lever 179 moves outwardly, it imparts to the shaft 180 a partial rotation. Pivotally secured to a bracket 181 on the shaft 180 is a rod 182 slidable through a housing 183. At its forward end, rod 182 is pivotally connected to an arm 184 of a member 185 including a gear segment 186. This gear segment is in mesh with a pinion 187 secured on a shaft 188 extending through the plate 20 and cut away at opposite sides at its upper end to provide a lug 189 (see Fig. 3).

As rod 182 is pulled, it rotates the member 185 against the action of a spring 190 to rotate the pinion 187 and shaft 188. Also the member 185 carries a finger piece 191 which, when the member is rotated, engages an arm 192 secured to the lower end of the rod 68. As member 192 is moved by engagement of the finger 191 therewith, rod 68 will be rocked carrying with it the reversedly curved lever 64. As shown in Fig. 8 this rod is slidably mounted on its pivot 65 (Fig. 1) and held in normal position by a coil spring 193. Thus the lever may be caused to slide laterally on its pivot on compressing this spring. Such movement of the lever will carry the roller 67 out of the path of the cam 63 so that the knife or chopping lever 72 will not be actuated to remove a record from the reservoir on the rotation of cam 62.

Above the plate 20 the stud portion 189 of the shaft 188 enters a notch in the lower end of a stud 194 journaled in a bearing 195. To the upper end of the stud 194 is secured an arm 196 offset downwardly, and at its free end carrying a reversing member 198 including a flexible plate-like portion 199 and a spring frame member 200 connected with the member 199 as at 201, and also by the spring piece 202. At its lower end, the frame-like member 200 is free of the plate-like member 199 and normally sets forwardly thereof.

Figure 5:
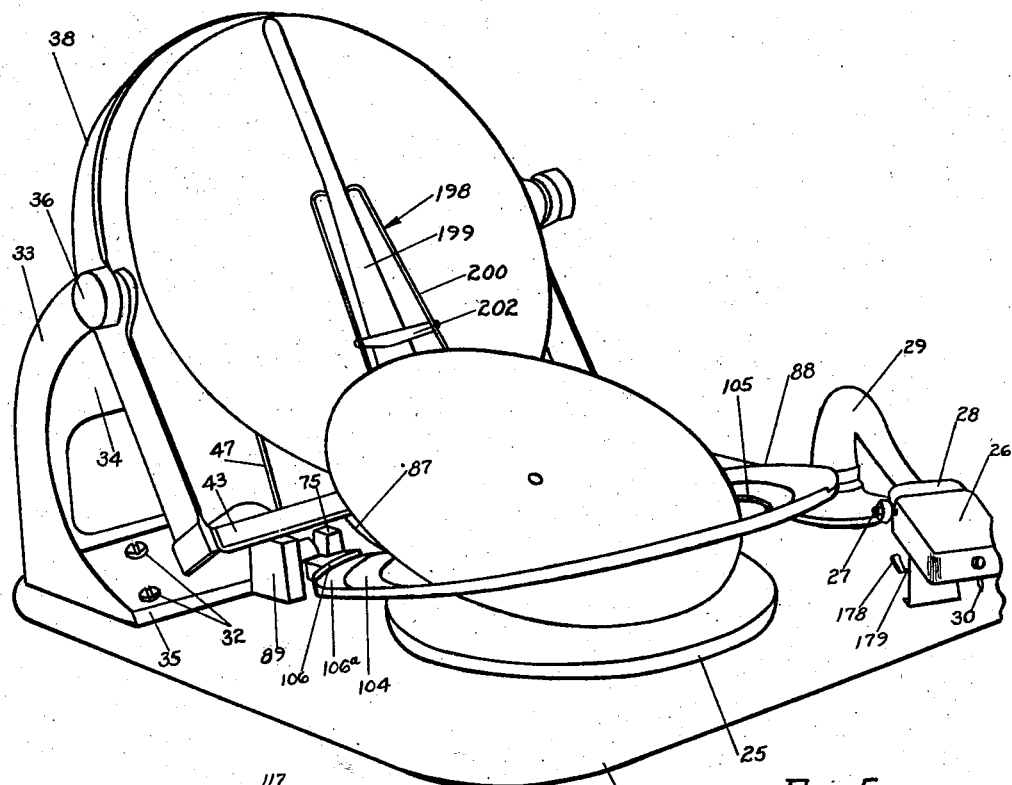
Fig. 5 is a perspective view of the upper portion of the mechanism shown in the act of reversing a record.
Figure 20:
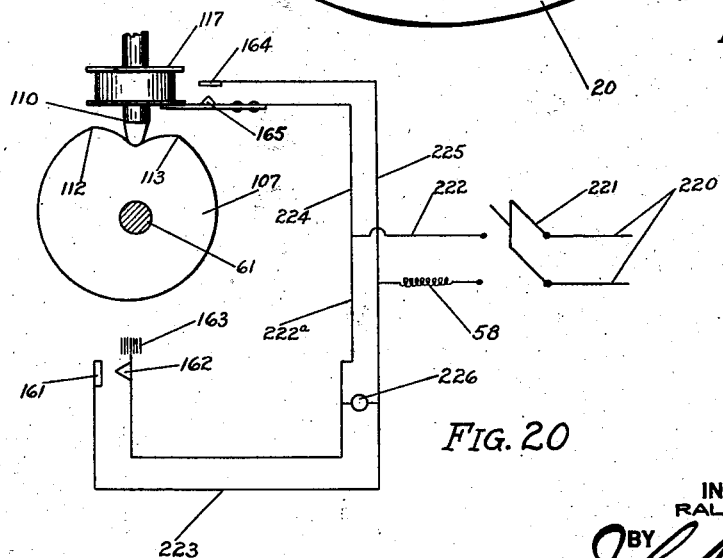
Fig. 20 is a wiring diagram.

When the member 185 is rotated as previously described, and rotates the pinion 187 and shaft 188, the reversing member 198 will be swung from a position to one side of the magazine as shown in Fig. 3 to a position in front of the magazine in which position it slopes rearwardly as shown in Fig. 5. Now, as the pan 88 acts to return a record to the magazine, the record will be disposed against the member 198, which will cause it to slide back onto the turntable in reversed position as suggested in Fig. 5, owing to the fact that it cannot enter the magazine. It is assisted in its sliding action by the lowering movement of the pan 188. Owing to its construction and mounting, the frame member 200 is resilient, and as the record is placed against it, is compressed but prevents the record from getting onto the pins 44 and 45.

After the record has been returned to the turntable in reversed position, the reversing member 198 is swung back to its original or normal position at the side of the magazine. This may be accomplished to some extent by the spring 190, but positive means are also provided for this purpose. To this end the cam 171 is equipped with a shoe 203 which engages over a roller 204 on lever 179, and draws the lever inwardly to the innermost dotted line position shown in Fig. 13, thus rocking the shaft 180 and projecting the rod 182 to swing the parts back into the position shown in Fig. 8. In this figure it will be seen that the rigid curved lever 64 is in a position to be engaged by the cam 63 on the periphery of the large cam 62.

When the cam 171 begins to revolve to move the arm or lever 179, a pin 205 carried by the cam engages an upright 206 on a part 207 movable with, and relative to the beam 93. As the pin 205 hits the upright 206, it slides the bar 207 in the bearings 208 and 209, rocking the cross-head 210 to withdraw pin 91 from cam groove 90, and to move pin 211 into cam groove 212. On the reverse movement of the cam, that is, when the shoe 203 has engaged the roller 204 and is returning the parts to their normal position, a finger 213 also on the cam arrangement 171 engages a roller 214 carried by the bar 207 to retract finger 211 from the groove 212, and to move finger 91 into groove 92.

It will be noted that the cam groove 212 is much shorter than the cam groove 90. Cam groove 212, of course, serves to swing the magazine or rack 38 to assist in placing a record on the turntable in reversed position. The difference in the size of the cam grooves results from the fact that when a new record is being placed on the turntable, the magazine must move a distance such that the record will be carried from the pads or bumpers 75 into playing position, whereas when the record is being reversed the record is moved only a distance from the front of the rack, or, more particularly, from the front of the reversing member 198 to playing position. Therefore, it will be readily apparent that the rack must move a greater distance when a new record is being supplied.

After finger 213 has moved the slide bar 207 so as to position fingers 91 and 211 as shown in Fig. 12, it will be apparent that the parts will next act to return the played record to the machine and to remove a new record therefrom, and place it on the turntable. Owing to the two-to-one gearing between the shafts 61 and 168, the reversing mechanism is only brought into operation on each second revolution of the shaft 61.

When the pan 88 moves up and the reversing member 198 is positioned as shown in Fig. 5, the record is placed on the member 198 with that side which has been played against the member, therefore as the record slides downwardly owing to the lowering of the pan 88, the rotation of the disc, and the movement of the magazine carrying with it the member 198, the record slides downwardly presenting for playing the side which was previously on the turntable. Owing to the particular connection between the shaft 188 and stud 194, the stud and reversing member 198 are free to move outwardly with the rack when it is tilted. However, during this outward movement the stud is locked against rotation in the bearing 195 (see Fig. 2) by means of a latch member 215 having a latching finger 216 passing through the bearing 195.

This latching member is pivoted as at 217, and is normally urged into operative position by spring 218. The latch is held out of operation owing to engagement of its free end 219 with the bearing block 89 when the frame or rack 38 is in normal position. However, when the rack moves or is swung outwardly, end 219 is removed from the bearing block 89, and spring 218 acts to move finger 216 inwardly to lock the stud 194 against movement relative to the bearing 195 so that when the magazine moves back to normal position, the stud 194 will be properly coupled with the shaft 188.

The circuit is shown in Fig. 19. Current from the line 220 is passed through the instrument on the closing of the switch 221. However, there is no circuit to the solenoid coil 58 until the record feeding the brush 163 moves the contact member 162 into engagement with the contact member 161. Now there is a circuit through wire 222, wire 222a, through the contacts 162 and 161 to wire 223 to the coil 58. By the time contacts 161 and 162 move apart, contacts 164 and 165 are engaged, and the circuit may then be described as from wire 221 to wire 224 through contacts 164 and 165, to wire 225 to the coil 58.

When for any reason a record has been fed to the turntable, and the operator does not wish to hear the record, but wishes to hear some other record, he closes the circuit to the solenoid 58 by operating the push-button or switch 226 to close the circuit at that point. The circuit would then be from wire 221 to wire 222 through switch 226 to wire 223 to the solenoid coil 58. The machine would then go through the operation of returning the unplayed record to the stack, or reversing it as the case may be, and if the unplayed record is returned to the stack, a new record would be placed on the turntable.

Means are provided whereby the machine, in lieu of the ordinary stylus, employs a length of wire which is fed forward as it is worn away. This means is attached to the bottom of the pick-up 26, and includes a wire 227 which may be coiled within the housing 228 and which extends under a gripping cam 229, under a feeding member 230, and through the stylus holder 231 of the pick-up.

A gauge 232 is utilized to limit the length of the wire which projects from the stylus holder 231. On depression of the lever 233, member 230 is rocked against the tension of spring 234, and at the same time, the end 235 of the lever contacts with the gauge 232, rocking it up into a position in front of the stylus holder, where it will be engaged by the wire as the latter is fed through the stylus holder. The member 230 normally presses on the wire to bow it, and to hold it against movement. When this member or element is elevated by the lever 233, the wire tends to straighten, and cam 229 preventing backward movement, the wire moves outwardly through the stylus holder until it comes into contact with the gauge 232.

Means are provided for automatically operating the lever 233, and to this end a cam element 236 is rigidly mounted on the plate 20 in a position to be engaged by the lever when the pick-up 26 is swung to inoperative position as shown in Fig. 5, and also as shown in dotted lines in Fig. 2. As the pick-up rides up the cam surface 237, lever 233 is depressed, operating to feed and gage the wire as described.

It may sometimes happen that when the circuit coil 58 is broken the core will stick and fail to descend to rock lever 52 and move clutch element 49 out of engagement with clutch element 50. To take care of this situation mechanical means are provided for positively moving the clutch element 49. This means includes a lever 238 pivotally secured intermediate its ends to the clutch element 49, one end of the lever being weighted as at 239 and the other end being provided with a flat spring 240 engaging the pivoted portion of lever 52.

On shaft 61 is a finger or cam element 241 comprising sections 242 and 243 secured by screws 244. The section 243 carries the finger 245. When shaft 61 has made a complete revolution finger 245 strikes the weighted end of lever 238 forcing the lever upwardly and moving clutch element 49 out of engagement with element 50. As shown (Fig. 7) the spring 240 is secured as by screws 246 and an adjusting screw 247 is provided whereby the location of the weighted end of lever 237 relative to cam element 241 may be regulated.

The means just described for separating the clutch elements is a safety device. Ordinarily the clutch elements are separated by the action of a coil spring 248 on one end of a lever 249 rigidly secured to the pivot shaft 54 of lever 52.

Having thus described the invention, what is claimed is:—

1. In a machine of the character described, a turntable, a rack adjacent thereto for supporting a supply group of records, an oscillatory carrier operable between the rack and turntable, means for delivering records one at a time from one side of the group of records to the carrier for placement thereby on the turntable, means automatically operable incident to the completion of the playing of one side of a record for causing the carrier to remove the record from the turntable and means cooperating with said carrier for disposing said record in position to immediately slide back directly onto the turntable with its sides reversed.

2. In an automatic phonograph, a turntable, a reservoir in which a plurality of records are adapted to be supported one against the other, a main operating shaft, means operable by said shaft for causing records to slide from said reservoir to said turntable, and co-operating means operable from said shaft and adapted to reverse the position of the record on the turntable after one side has been played to immediately present the other side for playing, and one of said co-operating means serving to remove records from said turntable and restore them to said reservoir, each record being again reversed during transfer from the turntable to the reservoir for next presenting its original side for reproduction.

3. In an automatic phonograph, in combination, a horizontally disposed turntable fixed longitudinally of its center, a reservoir adapted to hold a plurality of records supported one against the other, means for transferring a record from the reservoir for placement in playing position on the turntable, and means operating to loosely engage the record without gripping for reversing its position on the turntable after one of its sides has been played to immediately present the other side for playing before replacement in the reservoir.

4. In an automatic phonograph, a turntable, a reservoir adapted to hold a group of records, mechanism for transferring a record from the reservoir to playing position on the turntable, said mechanism including means operating after one side of the record has been played to elevate the record and means for arresting the record in a position to slide back onto the turntable in reversed position.

5. In an automatic phonograph, a turntable, a reservoir adapted to hold a group of records, mechanism for transferring a record from the reservoir for placement in playing position on the turntable, said mechanism including means operating after one side of the record has been played to elevate the record and means for arresting the record in a position to slide back onto the turntable in reversed position, said elevating means acting to guide the record back into position on the turntable.

6. In an automatic phonograph, in combination, a horizontally disposed turntable, a magazine adapted to hold a plurality of records of various sizes in contacting relation, and mechanism for successively feeding said records irrespective of their size into playing position upon the turntable, said mechanism including means for removing each of said records from the turntable after having been played and returning it to the magazine.

7. In an automatic phonograph, in combination, a horizontally disposed turntable, a reservoir adapted to hold a group of records of various sizes irrespective of their arrangement in the group, said reservoir supporting the records on one side of the turntable supported one against the other, and mechanism for successively feeding said records from one side of the group into operative position upon the turntable irrespective of their size, said mechanism including means for removing the record from the turntable after it has been played and returning it to the other side of the group.

8. In an automatic phonograph, in combination, a horizontally disposed turntable, a reservoir adapted to hold a plurality of records of various sizes supported one against the other, mechanism for causing said records to slide successively into reproducing position on the turntable irrespective of their size, and means to reverse the position of the record on the turntable after one side has been played to immediately present the other side for playing, said mechanism including means to return the record to the magazine after both sides have been played.

9. In an automatic phonograph, in combination, a turntable, a magazine adapted to hold a plurality of records of various sizes, means for causing said records to slide from the magazine to playing position on the turntable, irrespective of the size of the records, said means including means for guiding the record in its sliding movement, and said guiding means being operable after one side of the record has been played for returning the record to the magazine.

10. In an automatic phonograph, in combination, a turntable, a reservoir adapted to hold a plurality of records, mechanism for feeding the records from the reservoir one at a time into operative position on the turntable, optionally operable means actuated during the operation of the machine to automatically reverse the position of a record on the turntable after one side of the record has been played without returning it to the reservoir whereby to immediately present the other side for playing, said mechanism including means for returning the record from the turntable to the reservoir with its sides reversed when but one side has been played, or with its sides in their original position when both sides have been played.

11. In an automatic phonograph, in combination, a turntable, a reservoir for holding a plurality of records of various diameters, mechanism for feeding the records of various diameters one at a time to the turntable irrespective of their diameters, and optionally operable means to immediately reverse the position of the record on the turntable after one side has been played whereby to immediately present the other side for playing, said mechanism including means for returning the played record to the reservoir with its sides reversed when but one side has been played or with its sides in their original relative positions occupied when first placed in the reservoir when both sides have been played.

12. In an automatic phonograph, in combination, a turntable, a record reservoir for holding a plurality of records, mechanism for feeding records from the reservoir to the turntable including means for transfering a record from the turntable to the reservoir after one side of the record has been played, and means automatically movable into the path of movement of the record being returned to the reservoir to cause the record to return to the turntable in reversed position.

13. In an automatic phonograph, in combination, a turntable, a movable record reservoir for holding a plurality of records, mechanism for feeding records from the reservoir to the turntable, including means for transferring a record from the turntable to the reservoir after one side of the record has been played, and means automatically movable into the path of movement of the record being returned to the reservoir to cause the record to slide back onto the turntable with sides reversed, said last mentioned means being carried by the reservoir.

14. In combination with a phonograph for playing disk records, a horizontally disposed turntable fixed longitudinally of its center of rotation, means for supporting a group of records of varying sizes one against the other, and means for shifting said various sized records irrespective of the size thereof from the group to the turntable and from the turntable to the group.

15. In combination with a phonograph for playing disk records, a horizontally disposed turntable fixed longitudinally of its center of rotation, a reservoir for supporting a plurality of records of varying sizes supported one against the other, and means for causing said records to slide from the reservoir onto the turntable irrespective of the size thereof and thereafter return the record from the turntable back to the reservoir.

16. In a machine of the character described, a turntable, a group of records supported one against the other on one side of said turntable, an oscillatory carrier operable between said records and turntable for receiving a record from the group and placing it on said turntable and after reproduction thereof, removing the record from the turntable and means associated with said carrier for causing said record to immediately slide directly back onto the turntable with its sides reversed.

17. In a machine of the character described, a turntable, a group of records supported one against the other on one side of said turntable, an oscillatory carrier operable between said records and turntable for receiving a record from the group and placing it on said turntable and after reproduction thereof, removing the record from the turntable and means associated with said carrier for causing said record to immediately slide directly back onto the turntable with its sides reversed, and after the playing of the reverse side thereof, return said record to the group.

18. In a machine of the character described, a turntable, a group of records supported adjacent thereto, an oscillatory carrier operable between said records and turntable for receiving a record from one side of the group of records for placement thereof on the turntable for reproduction, said carrier being automatically operable incident to the completion of the reproduction of said record to remove the same from the turntable, and means associated with said carrier for reversing the record thereon for replacement by said carrier upon the turntable in reverse position, said carrier being actuated thereafter upon the reproduction of the reverse side of the record to return the record to the other side of the group.

19. In an automatic phonograph, in combination, a turntable, a record reservoir for holding a plurality of records, means for transferring records from the reservoir to the turntable and from the turntable back to the reservoir after one side of the record has been played, and optionally operable means automatically movable into the path of movement of the record being returned to the reservoir for causing it to return to the turntable in reversed playing position.

20. In combination with a phonograph including a turntable, a frame mounted at the side of the turntable, and means for lifting a record from the turntable, dropping it against said frame and guiding it back onto the turntable in a reversed position to that previously occupied by it.

21. In combination with a phonograph including a turntable, a sliding and guiding means disposed at the side of the turntable, and means for lifting a record from the turntable and disposing its obverse side against said sliding and guiding means whereby the record slides back onto the turntable with its reverse side disposed upwardly.

22. In combination with a phonograph including a record carrying turntable, a pair of converging arms vertically disposed at the side of the turntable, a ring disposed about the turntable in a position to engage the edges of the record and lift the record off the turntable, means to swing the ring upwardly to dispose the record with its obverse side against said converging arms, said means then swinging said ring downwardly whereby the record slides downwardly, guided by the ring and arms onto the turntable, with its reversed side disposed upwardly in position for playing.

23. In an automatic phonograph, a turntable, a reservoir adapted to hold records of mixed sizes without regard to the location of the records of various sizes, and mechanism for transferring records successively from said reservoir to the turntable irrespective of their sizes, said mechanism including means for returning each record from the turntable to the reservoir in inverted position to that previously occupied thereby.

24. In an automatic phonograph, a turntable, a reservoir adapted to hold a plurality of records, mechanism for shifting records successively from said reservoir to the turntable, said mechanism including means for removing a record from said turntable, and automatically operated means cooperating with said mechanism for engaging the record and immediately returning it directly to the turntable in reversed position for presenting the other side thereof.

25. In an automatic phonograph, a turntable, a reservoir mounted at one side of the turntable adapted to hold a group of records of mixed sizes supported one against the other without regard to the location of the records of various sizes, mechanism for shifting records successively from said reservoir to the turntable irrespective of their sizes, said mechanism including means for raising each record from the turntable and moving it toward the reservoir, and means cooperating with said mechanism for returning the record to the turntable in reversed position for presenting the other side thereof.

26. In an automatic phonograph, a turntable, a reservoir adapted to hold a plurality of records, mechanism for shifting records successively from said reservoir to the turntable, said mechanism including means for removing a record from said turntable, means cooperating with said mechanism for engaging the record and returning it to the turntable in reversed position for presenting the other side thereof, said first mentioned means being operable to return the reversed record to the reservoir with its sides in the same relative position as that occupied prior to its removal therefrom.

27. In an automatic phonograph, a turntable, a reservoir adapted to hold a group of records of mixed sizes without regard to the location of the records of various sizes, mechanism for shifting records successively from said reservoir to the turntable irrespective of their sizes, said mechanism including means for raising each record from the turntable and moving it toward the reservoir, and means cooperating with said mechanism for returning the record to the turntable in reversed position for presenting the other side thereof, said first mentioned means being operable to return the reversed record to the reservoir with its sides in the same relative position as that occupied prior to its removal therefrom.

28. In an automatic phonograph, a turntable, a reservoir adapted to hold a group of records supported one against the other, mechanism for transferring said records successively from one side of the group to the turntable for the reproduction of one side thereof and returning the reproduced record to the other side of the group, and means cooperating with said mechanism for reversing the record on the turntable for reproduction of the opposite side thereof prior to its return to the group of records in the reservoir.

29. In an automatic phonograph, a turntable, a reservoir adapted to hold a group of records supported one against the other, mechanism for transferring said records successively from one side of the group to the turntable for the reproduction of one side thereof and returning the reproduced record to the other side of the group, means cooperating with said mechanism for reversing the record on the turntable for reproduction of the opposite side thereof prior to its return to the group of records in the reservoir, and manually controlled means for rendering said first mentioned means inoperative to permit said record to be returned to the reservoir without reproduction of the reversed side thereof.

30. In an automatic phonograph, a turntable, a reservoir adapted to hold a group of records of mixed sizes supported one against the other without regard to the location of the records of various sizes, mechanism for transferring said records successively from one side of the group to the turntable irrespective of their sizes for reproduction of one side thereof and returning the reproduced record to the other side of the group, means cooperating with said mechanism for reversing the record on the turntable for reproduction of the opposite side thereof prior to its return to the group of records in the reservoir, and manually controlled means for rendering said first mentioned means inoperative, to permit said record to be returned to the reservoir without reproduction of the reversed side thereof with its sides reversed in respect to their positions when removed from said turntable.

31. In an automatic phonograph, the combination with a group of records of different sizes supported one against the other, of a turntable, means for automatically effecting the transfer of a record from one side of the group to the turntable and from the turntable to the other side of the group, and means for reversing the record for immediate reproduction of the opposite side thereof before its return to the group.

32. In an automatic phonograph, the combination with a group of records of different sizes supported one against the other, of a turntable, means for automatically effecting the transfer of a record from one side of the group to the turntable and from the turntable to the other side of the group, a reproducer, means for controlling the reproducer to automatically position at the beginning of the record irrespective of the size thereof, and means for reversing the record for immediate reproduction of the opposite side thereof before its return to the group.

RALPH R. ERBE.